March 4, 1924. 1,485,562
W. LUMLEY
REENFORCING BAR FOR CONCRETE CONSTRUCTIONS
Filed Sept. 29, 1919
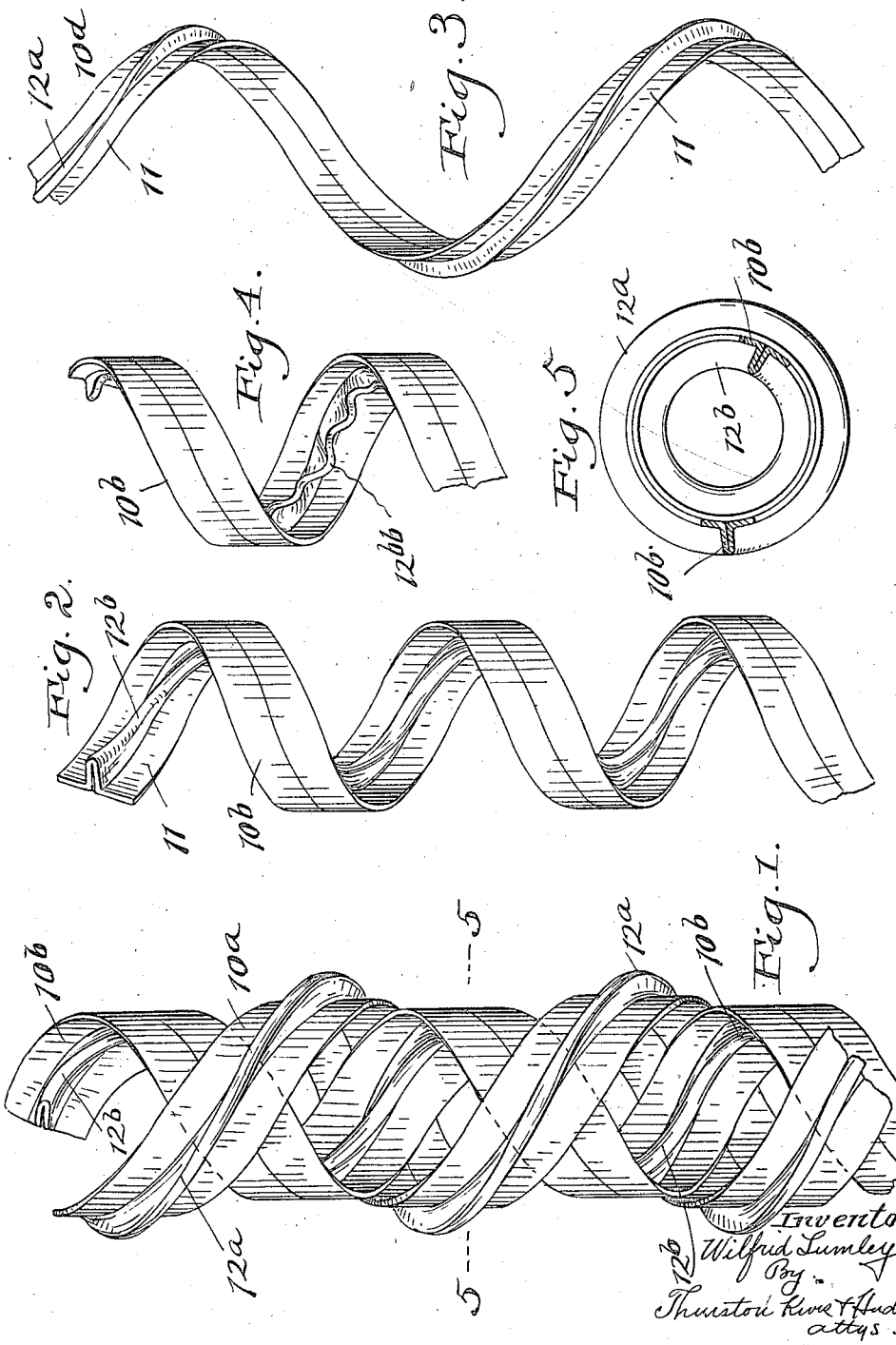

Patented Mar. 4, 1924.

1,485,562

UNITED STATES PATENT OFFICE.

WILFRID LUMLEY, OF CONNEAUT, OHIO.

REENFORCING BAR FOR CONCRETE CONSTRUCTIONS.

Application filed September 29, 1919. Serial No. 327,299.

*To all whom it may concern:*

Be it known that I, WILFRID LUMLEY, a citizen of the United States, residing at Conneaut, in the county of Ashtabula and State of Ohio, have invented a certain new and useful Improvement in Reenforcing Bars for Concrete Constructions, of which the following is a full, clear, and exact description.

This invention relates to reenforcing bars for concrete constructions such as columns, beams and slabs, and has for its principal object to provide a bar which is effective as a reenforcing member and can be produced economically. Further the invention aims to provide a reenforcing bar of the spiral type designed to serve as a binder to hold the concrete together, as well as to reinforce it in the ordinary sense in which this term is used, one of the more specific objects being to provide a spirally formed reenforcing element which is strong and self-sustaining, which has a large surface of contact with the concrete, which can be produced with any desired pitch in regard to its convolutions or spiral turns, which can be given spiral turns or convolutions of any desired diameter, and which can be formed to adapt the bar to be used singly or in interfitting pairs spirally formed in opposite directions.

The above and other objects are accomplished by my invention which may be briefly summarized as consisting in certain novel details of construction and combinations and arrangements of parts which will be described in the specification and set forth in the appended claims.

In the accompanying sheet of drawings, Fig. 1 is a side view of a two bar reinforcement, the two bars being spirally formed in opposite directions, one right handedly, and the other left handedly, and one fitted within the other; Fig. 2 is a similar view of a single bar, spirally formed in one direction; Fig. 3 is a similar view of a single reenforcing bar spirally formed in the reverse direction to that of Fig. 2, and illustrating the manner in which the pitch and diameter of the bar may be varied; Fig. 4 is a fragmentary view of a bar such as shown in Fig. 2, showing a slight modification in the form of a strengthening flange; and Fig. 5 is a sectional view substantially along the line 5—5 of Fig. 1.

My improved reenforcing bar is in the form of a spiral, and is of cross-sectional shape such that the bar is self-sustaining, i. e. will retain its form when set up, and may be formed either with a right handed spiral, as shown at $10^a$ in Figs. 1 and 3, or with a left handed spiral as shown at $10^b$ in Figs. 2 and 4, but preferably both right handedly and left handedly, for I contemplate that the bars be used singly or in interfitting pairs, in which event the bar spiraled in one direction is preferably fitted inside the bar spirally formed in the reverse direction, as illustrated in Fig. 1.

Preferably the bar in cross-section is T-shaped, including the body portion 11, and either an external flange as shown at $12^a$, or an internal flange as shown at $12^b$. As here shown, the bar $10^a$ formed with a right hand spiral has an external flange, and the bar $10^b$ formed with a left hand spiral, has an internal flange, the object of this being to permit the two bars of slightly different diameters to be fitted or screwed one within the other, as in Fig. 1, with the body portions 11 in engagement with each other. The flanges $12^a$ and $12^b$ can be given either a plain spiral form, or they may be corrugated, or be given an irregular spiral as shown at $12^b$ in Fig. 4, this form of the flange being more readily given to a bar having an internal flange than one having an external flange.

This reenforcing bar, whether spiraled right handedly or left handedly, and whether formed with an internal flange or an external flange, may be formed from a solid T-bar, but preferably from a flat bar, which in one continuous operation, or virtually with a single machine can be flanged and spiraled, it being only necessary to provide a machine with suitable juxtaposed flanging rolls and spiraling rolls. By the proper design and positioning of the spiraling rolls. the bar can be turned out with a spiral of any desired diameter, and with a pitch of any desired length, it being understood that the diameter and pitch, as well as the size or cross-sectional area of the bar will depend upon the design of the concrete structure in which the bars are to be utilized.

When a flat bar is used to form the flanged spiral reenforcing bar, the flat bars run into one side of the machine and are removed in finished state from the other side, the marginal portions of the flat bar forming the body of the reenforcing bar 10ª or 10ᵇ, and the flange 12ª or 12ᵇ being U-shaped or formed by doubling upon itself the middle part of the flat bar. The doubled portions or legs forming the flange may be either in engagement or slightly separated, as may be found desirable or most effective for reenforcing purposes.

This spirally formed bar, or double bar composed of the two interfitting units is particularly useful in taking the place of the ordinary spirally formed rod which must be held in place by rods running parallel to the axis of the spiral reinforcement and usually provided with notches to hold the different convolutions or turns of the spiral rod the right distance apart. Generally, therefore, in the use of my invention, either a single bar, or a two unit bar will be arranged centrally with respect to the concrete structure, such as a column or girder, the surface or perimeter of the bar being located a suitable distance from the surface of the concrete. But it will be understood, however, that a series of these bars may be placed or distributed about in the concrete, spaced apart as the design of the structure requires. In the latter case, the diameter of the spiral will be relatively small, and the cross-sectional area of the bar will also be small. However, as before stated, it is a feature of my invention that the size of the stock from which the bar is formed, as well as the diameter of the spiral and the pitch of the spiral can be varied within very wide limits, thus adapting it for many uses, and for structures of widely differing designs.

Having described my invention, I claim:

1. A reenforcing unit for concrete structures composed of two spiral flanged bars one located within the other, one spiraled in one direction, and the other spiraled in the reverse direction and on a smaller diameter than the first.

2. A reenforcing unit composed of two interfitting oppositely spiraled bars, one having an external flange, and the other an internal flange.

3. A reenforcing unit for concrete constructions composed of two bars spiraled in opposite directions, each substantially T-shape in cross-section, the outer bar having an external flange, and the inner bar an internal flange.

4. A reenforcing unit for concrete structures comprising two spiral bars, one located inside of the other, and one having an external flange, and the other having an internal flange.

In testimony whereof, I hereunto affix my signature.

WILFRID LUMLEY.